Nov. 27, 1962 D. STARKIE 3,065,519
METHOD OF PRODUCING CRIMPED THERMOPLASTIC YARNS
Filed Feb. 26, 1958 7 Sheets-Sheet 1

Inventor
David Starkie

By Michael S. Strike
Attorney

Nov. 27, 1962    D. STARKIE    3,065,519
METHOD OF PRODUCING CRIMPED THERMOPLASTIC YARNS
Filed Feb. 26, 1958    7 Sheets-Sheet 2

Inventor
David Starkie
By Michael S. Striker
Attorney

Nov. 27, 1962  D. STARKIE  3,065,519
METHOD OF PRODUCING CRIMPED THERMOPLASTIC YARNS
Filed Feb. 26, 1958  7 Sheets-Sheet 3

Inventor
David Starkie

By Michael S. Striker
Attorney

Inventor
David Starkie
By Michael S. Striker
Attorney

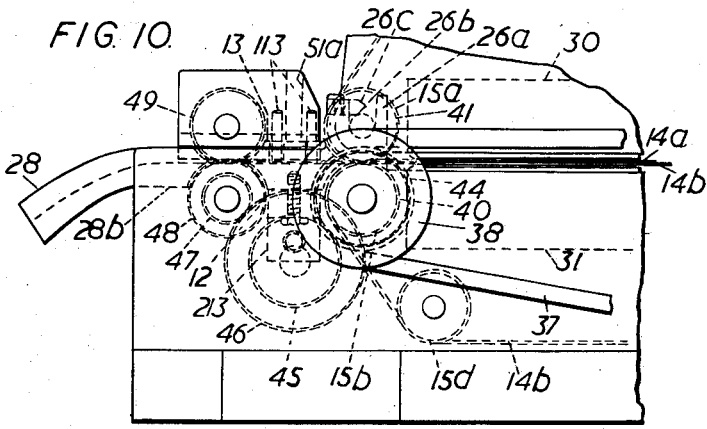
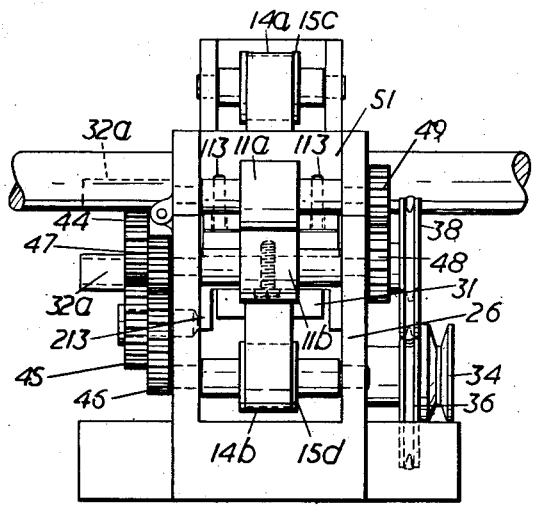

Nov. 27, 1962 D. STARKIE 3,065,519
METHOD OF PRODUCING CRIMPED THERMOPLASTIC YARNS
Filed Feb. 26, 1958 7 Sheets-Sheet 7
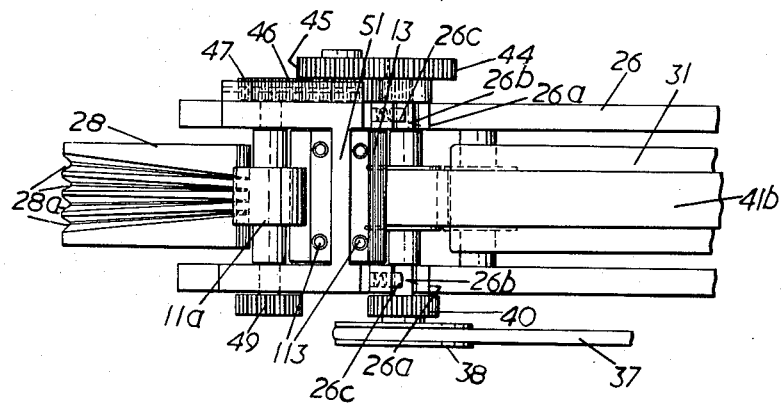
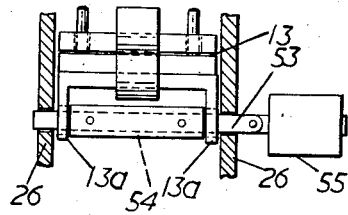
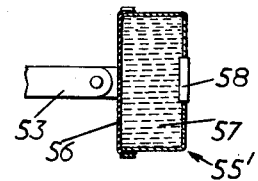
Inventor
David Starkie
By Michael S. Striker
Attorney United States Patent Office 3,065,519
Patented Nov. 27, 1962

3,065,519
METHOD OF PRODUCING CRIMPED THERMOPLASTIC YARNS
David Starkie, Somercotes, England, assignor to English Rose Limited
Filed Feb. 26, 1958, Ser. No. 717,740
Claims priority, application Great Britain Mar. 7, 1957
10 Claims. (Cl. 28—72)

This invention refers to the manufacture of an improved synthetic fibre yarn of the "stretch" type. Such yarns are finding increasing application in textiles and particularly in hosiery by reason of the additional elasticity, close fit, and warmth which they impart to a knitted garment, and the fact that they enable one garment to fit a range of sizes.

A number of synthetic fibre yarns are already available to textile manufacturers. In general they are of the continuous filament type, containing either a single or a number of filaments, and all are able to be provided with stretch properties by reason of the thermoplastic nature of the materials from which they are made. Well-known examples of thermoplastic materials which are in common use as textile fibres are nylon and "Terylene." By thermoplastic nature is meant the ability of the material to retain the shape or form in which it has been held while at an elevated temperature.

The basis of manufacture of all stretch yarns is that the synthetic yarn is held in a crimped or folded condition by some means or other while at an elevated temperature and, on cooling, it remains crimped. If a crimped yarn is pulled, the crimps straighten out and the yarn extends in length; when the extending force is removed, the crimps reform and the yarn contracts in length. It is obvious that the type, shape, and size of the crimps will have a pronounced effect on the degree of extensibility and recovery, and the thermal insulating properties of the garment made from a stretch yarn.

Many of the existing stretch yarns depend for their elastic properties on the insertion of a high twist at some stage of their production. Twisting, heat-setting, followed by untwisting by various amounts is one method favoured in the preparation of a number of them; others are made using variations of this method by relying basically on the insertion of twist. At least one stretch yarn is made by a method other than twisting: in this the yarn is drawn over an edge under tension whilst the filaments are hot; on being subjected to a relaxing treatment, a spiral crimp develops in the yarn.

An important outlet for stretch yarns is in the construction of fine gauge hose. For this use the present stretch yarns fall below that which is ideal as regards one or more of the following criteria: the appearance of the hose made from them both during wear and particularly in the collapsed form in which they are offered for sale, the incidence of defects and blemishes in the finished hose, lack of sheerness in the hose, variations in the stretch properties, and, in some cases, the slow rate of production which makes the yarns expensive to prepare. The objections are at least in part eliminated by the use of a yarn made according to the method detailed in this specification.

An object of the present invention is to produce an improved stretch yarn intended primarily for use in the construction of fine gauge hose but which is not confined solely to such use as its particular properties make it of value for other textile uses.

This invention provides a method of manufacturing a synthetic fibre yarn of the "stretch" type which comprises passing a thermoplastic yarn through a tunnel under conditions such that it arranges itself therein in a winding (e.g. sinuous) form and emerges in such a form, and setting the yarn in such a form by heat treatment. The heat treatment may be applied while the yarn is travelling through the tunnel but it is preferred to apply it to the yarn after emergence from the tunnel. For this latter purpose, on emergence from the tunnel the yarn may be gripped between travelling surfaces and heated while so gripped; the yarn may be cooled following the heating whilst still gripped by the travelling surfaces. The travelling surfaces may be those of two endless travelling bands.

The tunnel may have a major and a minor transverse dimension such that sinuosities are formed substantially in the plane of the major dimension. For example, the tunnel may have a major transverse dimension which determines the amplitude of the sinuosities and a minor transverse dimension which is only slightly greater than the thickness of the yarn being pushed into the tunnel.

It will be appreciated that the frictional drag on the passage of the yarn, and/or the impedance imposed by a take-off device (such as the travelling surfaces above mentioned) acting on the yarn on emergence from the tunnel, causes the yarn that is pushed into the tunnel to cockle therein and to assume a sinuous form. By using a tunnel having a major and a minor transverse dimension as above specified, the cockling is restricted to the major dimension. If the tunnel is of circular or substantially circular form the cockling, instead of being confined to one plane, may take place in haphazard manner or indeed the yarn may adopt a helical disposition. If the yarn is heat treated while passing through the tunnel it is set while in the assumed disposition. Alternatively if the yarn is gripped and heat treated between two travelling surfaces upon emergence from the tunnel, the cockles or sinuosities are forced into one plane and are set in that plane.

This invention includes the yarn and also apparatus for carrying the method into effect.

The above and other features of the invention set out in the appended claims are incorporated in the method, apparatus, and yarn which will now be described as specific embodiments with reference to the accompanying drawings in which:

FIGURE 10 is an enlargement of a crimping tube part of said unit;

FIGURE 11 is an end view of said unit;

FIGURE 12 is a plan view of FIGURE 10 with a top part removed;

FIGURE 13 is a cross-sectional scrap view showing vibratory means for the crimping tube; and FIGURE 14 is a diagrammatic detail illustrating modified vibratory means.

Figure 1:
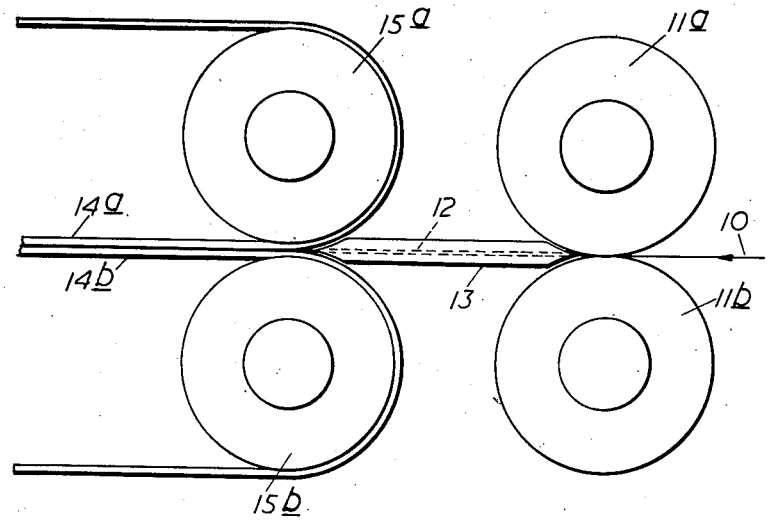
FIGURE 1 shows the more important parts of the apparatus in a diagrammatic manner and in side elevation.
Figure 2:
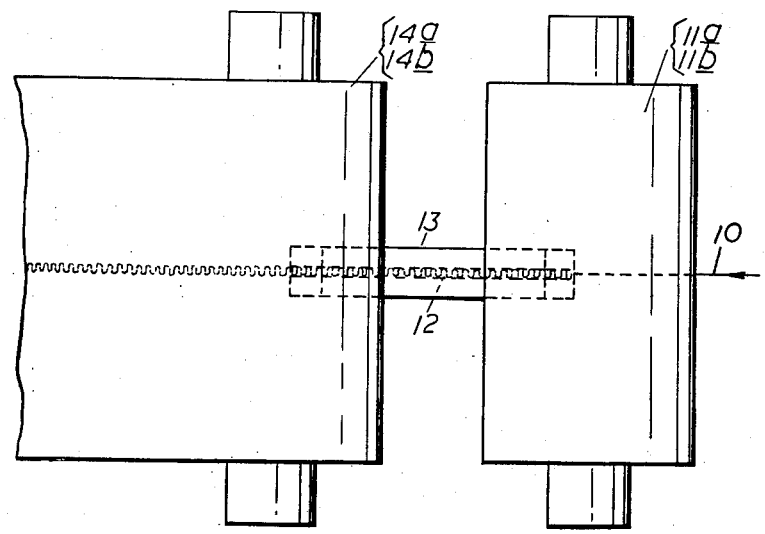
FIGURE 2 is a plan view of such parts.

Referring primarily to FIGURES 1 and 2 the thermoplastic yarn 10 to be treated is fed between feed rolls 11a, 11b into a tunnel 12 in a crimping tube 13 and on emergence therefrom is gripped between two endless bands 14a, 14b traveling over rollers of which two are shown at 15a and 15b.

The tunnel 12 is substantially oblong in cross-section. Its height is less than twice the diameter of the yarn being fed into it and its width bears a relation to the amplitude of the crimp that it is desired to impart to the yarn. It will readily be understood that if the yarn is prevented from emerging from the far end of the crimping tube 13 or if it is prevented from emerging at the same speed as that at which it is pushed into the tube, the yarn will assume the meandering form shown in FIGURES 2 and 4. To help the yarn to take up this form the crimping tube 13 may be vibrated in the direction of the major transverse dimension of the tunnel which, in the example illustrated, is in a direction parallel with the axes of the feed rolls 11a, 11b. The frequency of vibration necessary is determined by the speed at which the straight yarn is fed by the feed rolls into the crimping tube. For very high rates of feed the frequency may be in the region known as supersonic. The vibration is conveniently applied by electro-magnetic means but other means of producing a high frequency vibration can be used. However vibration is not essential Once the crimping tube 13 is filled with yarn in its meandering or crimped condition, the crimped yarn is allowed to emerge from the tube at the far end of the latter and, without being allowed to unfold, is trapped between the endless bands 14a, 14b. The latter carry the crimped yarn away from the crimping tube 13 and it will be understood that the linear speed of these bands is less than that at which the yarn is pushed into the tube by the feed rolls 11a, 11b.

On emergence from the tube 13 the yarn is heat treated to set the crimps. For this purpose it may be heat treated between the bands 14a, 14b, the latter being made of steel or other suitable material and heated by any suitable means such for example as by dielectrics. If desired the bands 14a, 14b may be cooled by cooling means following the heating. As the yarn emerges from between the bands it can be wound in its crimped and set condition on to any type of yarn package. It is then ready for knitting.

Figure 3:
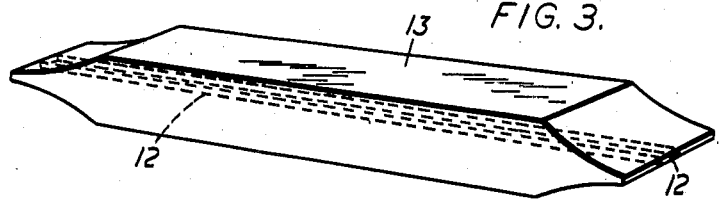
FIGURE 3 is a perspective view of a crimping tube containing the tunnel before mentioned, on a larger scale.

The crimping tube 13 is shown in perspective in FIGURE 3. The two ends of the tube are taken off at a radius, as will be clearly seen from FIGURES 1 and 3, so as to enable the ends of the tube to fit closely into the nip between the feed rolls 11a, 11b and into the nip between the bands 14a, 14b where the latter pass around the rolls 15a, 15b. This enables the thrust of the feed rolls 11a, 11b on the yarn 10 to be directed into the tunnel 12 without the yarn being able to escape at the leading end of the tube, and permits the take-off bands 14a, 14b to grip the crimped yarn as it emerges from the tube before this crimped yarn has an opportunity to change from that form.

Figure 4:
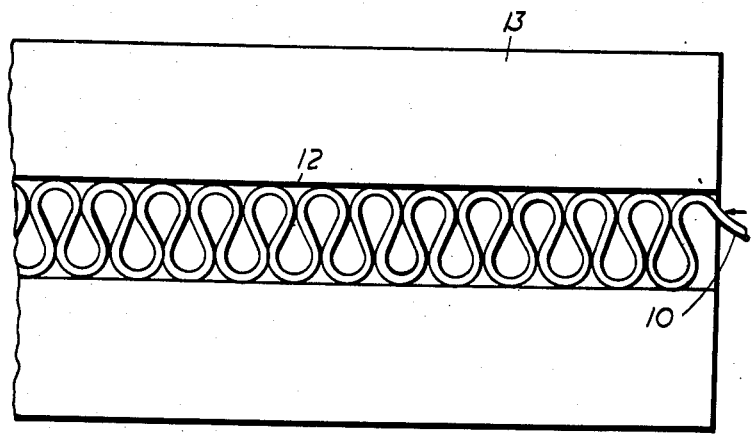
FIGURE 4 is a sectional view through the tunnel illustrating the manner in which the yarn is crimped therein.
Figure 5:
FIGURES 5 and 6 show alternative forms of the finished yarn.
Figure 6:

FIGURE 4 illustrates the manner in which the initially straight yarn 10 becomes folded inside the bore of the crimping tube 13 (i.e. in the tunnel 12) under pressure from the feed rolls 11a, 11b. In order to take-off the yarn from the crimping tube 13 in its crimped or meandering form the rate of take-off is appreciable slower than that of feed-in, for which purpose the rolls 15a, 15b carrying the heated bands 14a, 14b rotate at a less peripheral speed than do the feed rolls 11a, 11b. In this way a resistance to emergence of the yarn from the tunnel 12 is continuously applied and the feed rolls 11a, 11b can continue to force the yarn into the desired crimped condition inside the tunnel 12. The relative speeds of feed-in and take-off from the crimping tube 13 must be adjusted to ensure that the yarn is set in the desired crimped form. For example in the form shown in FIGURE 5, successive crimps are closely spaced. Such yarn is highly extensible and will give good extension for quite low loads applied to it. It will be appreciated that the spacing or pitch of the crimps may be controlled by varying the speed of take-off. For example if the take-off bands 14a, 14b are speeded up slightly the effect may be either that the yarn is not formed in the tunnel into such closely spaced crimps or if it is formed into closely spaced crimps in the tunnel then these crimps are opened out somewhat upon emergence from the tunnel. A yarn somewhat as shown in FIGURE 6 results. The speed of the bands 14a, 14b may be variable at will relative to that of the rolls 11a, 11b, for which purpose change-speed gearing or infinitely-variable gearing may be employed.

The transverse dimensions of the tunnel must be selected to suit the particular denier or size of yarn being processed and the amplitude of crimp. The width of the tunnel (i.e. its major transverse dimension) is determined by the desired amplitude of crimp; the height of the tunnel (i.e. its minor transverse dimension) must be such as to prevent one thickness of yarn being forced on top of another inside the tunnel. 15 denier nylon yarn has a diameter of 0.0017" and suitable dimensions for the tunnel in processing such a yarn could be width 0.01" and height 0.002". It will readily be understood that an increase in the width of the tunnel would result in this yarn having a greater amplitude of crimp. It is intended to provide different crimping tubes having tunnels of varying dimensions to suit different deniers of yarns so that an appropriate tube can be selected. Alternatively the crimping tube may be so constructed that the dimensions of its bore or tunnel can be varied.

It is not necessary to provide a pair of feed rolls and a pair of take-off bands for every crimping tube that is being operated at a given time. A plurality of crimping tubes each with one or a plurality of side by side tunnels may be arranged side by side with a pair of feed rolls and a pair of take-off bands common to all the tubes or tunnels of each tube. This permits a plurality of identical yarns, each drawn from its own source of supply, being processed side by side into identical crimped yarns.

It may be desirable to reduce the resistance to bending of, for example, a mono-filament nylon yarn so that it will more easily take up the desired crimped form inside the tunnel provided that this temperature is suitably less than that for setting the yarn. For this purpose the temperature of the yarn may be thus raised as it is being fed into the tunnel. The yarn may be heated by any suitable means as for example by heating the feed rolls.

This invention may be employed in the manufacture of yarn of the stretch type from nylon or any other suitable thermoplastic material. The resultant yarn contains extremely fine and regular crimps of a definite and controllable shape and size along its entire length. Such a yarn extends uniformly under tension and the degree of extensibility and the ease of extension can readily be varied within certain limits by making simple adjustments to the apparatus as already described. The amplitude and the frequency of the crimp can be varied and selected to suit any particularly textile application. For example, in the case of fine gauge hose the crimp is selected to be small in comparison with the size of the knitted loops. It follows that in such a hose the crimp formation is superimposed on a larger loop of yarn and the general shape of the loop is maintained. The hose, even in the relaxed state in which it is effected for sale, therefore still retains its regular and even appearance and its "counter appeal" is good. A further advantage is that the tiny crimps produce a wide scattering of the light reflected from the yarn and the resulting hose is matt and dull in appearance; even when the hose is expanded to fit the leg during wear, the crimps are never entirely pulled out of the yarn and the matt appearance is maintained. In other instances such for example as in the instances of underwear, outerwear, or say carpets, the crimp could be of comparatively coarse nature. Such a crimp could be obtained and matched in dimensions for the particular instance by selecting the correct denier of yarn and by using a crimping tube of appropriate tunnel dimensions together with providing for the necessary relationship between the feed and take-off speeds. Finally the method of manufacture herein described is capable of being operated at a satisfactory high speed and allows of an economic production of crimped yarn.

Figure 7:
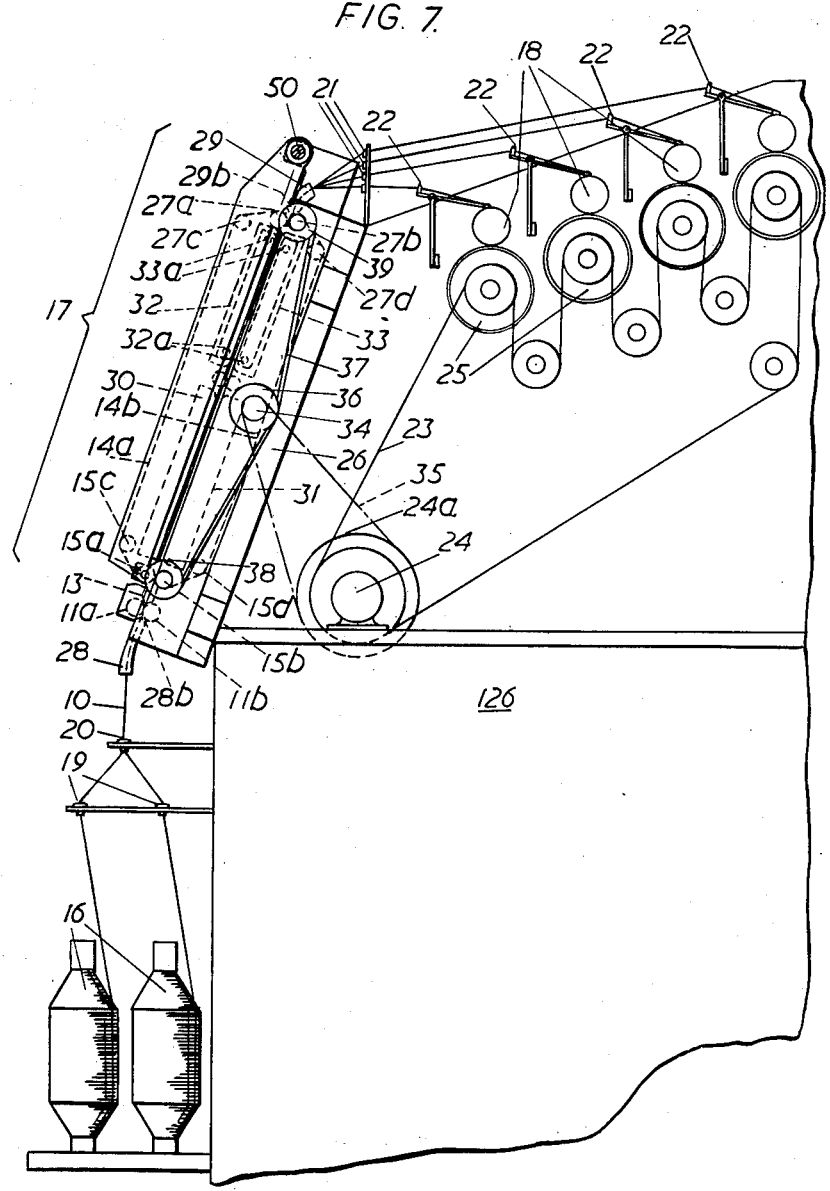
FIGURE 7 is an end view of the apparatus.
Figure 8:
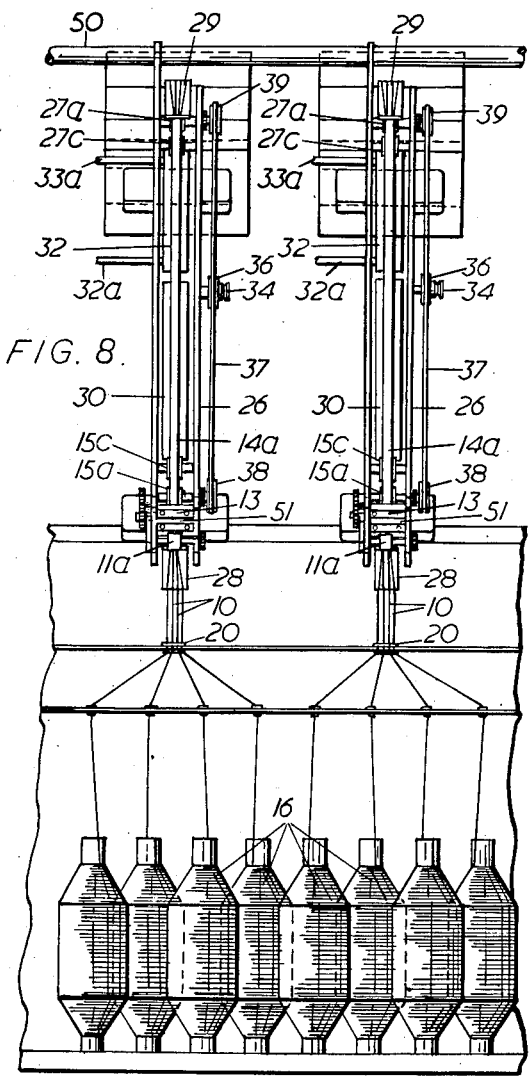
FIGURE 8 is a front view of part of the apparatus.

Referring now to FIGURES 7 and 8, these show that the yarns can be drawn upwards off yarn packages 16, next passed further upwards through a crimping and setting unit 17 which is slightly inclined to the vertical, and then drawn substantially horizontally rearwards on to separate take-off means 18. More specifically, from the yarn packages 16 the yarns 10 travel through spaced eyelet guides 19 and then converge to pass through a common eyelet guide 20 to the lower end of said unit 17. From the upper end of said unit 17 the yarns 10 diverge to eyelet guides 21 through which they pass to separately mounted eyelet guides 22 through which in turn the yarn further pass to the separate take-off means 18. The take-off means 18 are, in this instance, spindles with sleeves thereon for the yarns to be formed into cheeses thereon, and said spindles (and the cheeses thereon) are driven at constant peripheral speed by contact with cork covered rollers themselves driven by an endless belt 23 from a motor 24.

In an alternative (not shown) the take-off means may be known precision winding type to wind the yarns directly onto controlled speed cones.

As shown in FIGURE 8, the yarn packages 16 may be disposed across the front of the apparatus and each set of say four yarn packages may have their yarns crimped by their own unit 17, the units being disposed in suitable laterally spaced relationship.

Each unit 17 comprises a base support 26 (which, together with the yarn packages 16, the eyelets 19, 20, 21, 22, and the take-off means, are mounted on a support structure 126) said feed rolls 11a, 11b at the lower end, said crimping tube 13 with tunnel 12, and said two endless bands 14a, 14b which are of steel, traveling over the rollers 15a, 15b and further rollers 15c, 15d at the lower end and over rollers 27a, 27b, 27c, 27d, at the upper end.

In addition each unit 17 has lower and upper channel like yarn guides 28, 29 each of which is bent consistent with changes in direction of travel of the yarns 10 and each having V sectioned yarn guiding grooves such as shown at 28a in FIGURE 12. The grooves in the lower guide 28 converge upwardly and the grooves in the upper guide 29 diverge upwardly. Also the lower guide 28 is tapered at its upper end 28b to guide the yarn close up to the nip between the feed rolls 11a, 11b, for which purpose also the taper faces have the same curvature as that of the rolls and actually made contact therewith. The upper guide 29 is also tapered and has similar curved faces at its lower end 29b to be in contact with the upper curved faces of the endless bands 14a, 14b to guide the yarns immediately they leave said bands.

Each unit 17 further incorporates heaters 30, 31 such for example as electric resistance heaters, at opposite sides of the adjacent laps of the endless steel bands 14a, 14b to heat them. These heaters extend about halfway along said laps from the lower end, and, at opposite sides of the remaining upper parts of the laps there are cooling means 32, 33, to cool the bands, which consist of hollow castings with inlets 32a, and outlets 33a for water.

The feed rolls 11a, 11b together with the lower rollers 15a, 15b and the upper rollers 27a for the endless bands 14a, 14b are driven from the motor 24 by drive transmitting means. These means comprise a small sprocket 34 disposed halfway along the unit 17 and connected by a chain 35 to a large sprocket 24a on the motor spindle, a large sprocket 36 on the same axle as that of the sprocket 34 and driving an endless driving chain 37, and two small sprockets 38, 39 on the axles of the rollers 15b, 27b and driven by the driving chain 37 to drive the endless band 14b. On the axles of the sprockets 38, 39 there are pinions 40, 41 (see FIGURE 9) which mesh with pinions 42, 43, on the axles of the rollers 15a, 27a to impart drive to the other endless band 14a. As will be seen from FIGURE 10 there is a gear 44 on the same axle as the pinion 40 and it meshes with an equal idler gear 45. On the same axle as the idler gear 45 there is a larger gear 46 which meshes with a pinion 47 on the axle of the feed roll 11b to impart drive to this feed roll 11b. On the other end of the latter axle there is a pinion 48 meshing with a pinion 49 on the axles of the other feed roll 15a to impart drive to this feed roll 11a. This arrangement of gearing causes the feed rolls 11a, 11b to be driven at the required greater speed than that of the endless bands 14a, 14b.

Figure 9:
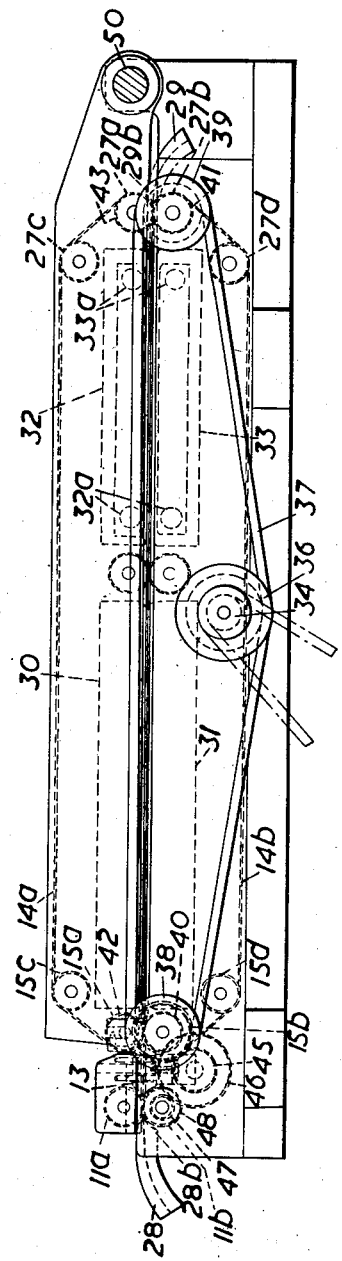
FIGURE 9 is an enlarged detail end view of a crimping unit.

As will be seen from FIGURE 9 the unit is constructed in two halves hinged together by an end hinge connection 50; this is for enabling threading up of the yarns.

One, displaceable half of the unit consists of the endless band 14a, the rollers 15a, 15c, 27a, 27c, the heater 30, and the cooler 32. The other, fixed, half of the unit consists of the endless band 14b, the rollers 15b, 15d, 27b, 27d, the heater, 31, the cooler 33, the feed rolls 11a, 11b, and the crimping tube 13.

In addition the feed roll 11a is mounted in a block 51 (FIGURE 11) which is pivoted by a hinge 52 to the fixed half of the unit. The crimping tube 13 is in two halves whereof one half is readily removably mounted on pegs 113 projecting from the other half which, in this instance, is fixed on a bracket 213, and each half has a groove forming half of the tunnel. Said block 51 has a bridge 51a for engaging and holding down the first half of the crimped tube.

For the actual threading up, the displaceable half of the unit 17 is swung clear to separate the two endless bands 14a, 15a. Also the block 51 is swung clear to separate the feed rolls 11a, 11b and the one movable half of the crimping tube 13 is lifted off the other half. The yarns 10 are drawn from the yarn packages 16, passed through the eyelet guides 19, 20, and laid in the grooves 28a of the guide 28, then placed between the feed rollers 11a, 11b, next laid in the grooves 28a, and at the other end of the unit 17, laid in the grooves of the guide 29, and then taken to the take-off means 18 after threading them through the eyelet guides 21, 22. The arrangement of the guides 28 and 29 maintain the yarns extending in a plane containing the outer surface of the endless band 14b and the grooves of the fixed half of the crimping tube 13. The block 15 is then returned to re-set the feed roll 15a, after refitting the movable half of the crimping tube 13, whereby the yarns become trapped in position. Then the displaceable half of the unit 17 is re-set for the yarns to extend between the adjacent laps of the endless bands 14a, 14b and, for releasable latching in position, the base support 26 may have side lugs 26 each formed with a slot 26b with which end parts of the axle of the roller 15a has releasable engagement, each slot having a spring pressed latch member 26c co-operating with the axle.

Means for vibrating the crimping tube 13 are shown in FIGURE 13. In this instance the relatively-fixed bottom half of the crimping tube 13 has lugs 13a, mounted on a rod 53 which latter is supported slidably in the base support 26. This rod is connected to a conventional type electric vibrator 55 to impart vibrations to the crimping tube 13 at an amplitude of say 10 thousandths of an inch. To permit this the relatively fixed half of the crimping tube 13 is mounted with a suitable clearance between it and the base support 26, and there is a spacing sleeve 54 between the lugs 13a which sleeve is fixed to the rod 53.

The mounting of the lugs 13a on the rod is conveniently by extended holes to allow settling down of the crimping tube 13 such that its convex tapered ends become practically in contact with the adjacent rollers.

The modified vibrator 55' shown in FIG. 14 comprises a diaphragm 56 actuated, through hydraulic fluid 57, by a supersonic vibrator 58.

I claim:
1. A method for producing a crimped thermoplastic yarn, comprising the steps of feeding a thermoplastic yarn which is flexible in all directions into a treating path at a predetermined speed; confining said yarn in said treat- ing path to one plane and limiting deflection of said yarn in said plane to a distance not greater than the maximum amplitude of the crimps desired in said yarn; and removing said yarn from said treating path at a speed less than said predetermined speed so that yarn removed from said treating path is in crimped form and is positioned in said one plane.

2. A method for producing a crimped thermoplastic yarn, comprising the steps of feeding a thermoplastic yarn which is flexible in all directions into a treating path at a predetermined speed; confining said yarn in said treating path to one plane and limiting deflection of said yarn in said plane to a distance not greater than the maximum amplitude of the crimps desired in said yarn; removing said yarn from said treating path at a speed less than said predetermined speed so that yarn removed from said treating path is in crimped form and is positioned in said one plane; and gripping the yarn removed from said treating path and holding it in crimped form by opposed substantially elongated travelling surfaces.

3. A method for producing a crimped thermoplastic yarn, comprising the steps of feeding a thermoplastic yarn which is flexible in all directions into a treating path at a predetermined speed; confining said yarn in said treating path to one plane and limiting deflection of said yarn in said plane to a distance not greater than the maximum amplitude of the crimps desired in said yarn; removing said yarn from said treating path at a speed less than said predetermined speed so that yarn removed from said treating path is in crimped form and is positioned in said one plane; gripping the yarn removed from said treating path and holding it in crimped form by opposed substantially elongated travelling surfaces; and heat setting said yarn in crimped form by heating it while held by said opposed travelling surfaces.

4. A method for producing a crimped thermoplastic yarn, comprising the steps of feeding a thermoplastic yarn which is flexible in all directions into a treating path at a predetermined speed; confining said yarn in said treating path to one plane and limiting deflection of said yarn in said plane to a distance not greater than the maximum amplitude of the crimps desired in said yarn; removing said yarn from said treating path at a speed less than said predetermined speed so that yarn removed from said treating path is in crimped form and is positioned in said one plane; gripping the yarn removed from said treating path and holding it in crimped form by opposed substantially elongated travelling surfaces; heat setting said yarn in crimped form by heating it while held by said opposed travelling surfaces; and cooling said yarn in crimped form by cooling it while held by said opposed travelling surfaces.

5. A method for producing a sinuous thermoplastic yarn, comprising the steps of feeding a thermoplastic yarn which is flexible in all directions into a treating path at a predetermined constant linear speed; confining said yarn in said treating path to one plane and limiting deflection of said yarn in said plane to a distance not greater than the maximum amplitude of the crimps desired in said yarn; removing said yarn from said treating path at a speed less than said predetermined constant linear speed so that yarn removed from said treating path is in sinuous form and is positioned in said one plane; and gripping the yarn removed from said treating path between a pair of endless travelling bands and holding it in sinuous form between said endless travelling bands.

6. A method for producing a crimped thermoplastic yarn of substantially regular amplitude and frequency, comprising the steps of feeding a thermoplastic yarn which is flexible in all directions at a predetermined substantially constant linear speed into the entry end of a treating path formed through an open-ended crimping tunnel limiting deflection of the yarn in all directions transverse to the direction of said treating path to a distance not greater than the maximum amplitude of the crimps desired in said yarn, removing said yarn from said treating path at the other end of said tunnel at a substantially constant linear speed less than said predetermined speed so that yarn removed from said tunnel is in crimped form having substantially regular amplitude and frequency and is positioned in said one plane; and gripping the yarn removed from said tunnel between a pair of opposed substantially elongated travelling surfaces which flatten said yarn in one plane and advance said yarn in crimped form.

7. A method as claimed in claim 6, employing a tunnel having a fixed length from a feeding opening to an extracting opening thereof and a cross-sectional area having a maximum dimension of substantially constant magnitude throughout said fixed length.

8. A method as claimed in claim 6, employing a tunnel having a fixed length from a feeding opening to an extracting opening thereof and a cross-sectional area having a maximum dimension of substantially constant magnitude throughout said fixed length, the crimping taking place substantially in the plane of said maximum dimension.

9. A method for producing a crimped thermoplastic yarn, comprising the steps of feeding a thermoplastic yarn which is flexible in all directions into a treating path at a predetermined speed; removing said yarn from said treating path at a speed less than said predetermined speed so that yarn removed from said treating path is in crimped form; confining said yarn along said path to limit deflection of said yarn in all directions transverse to the direction of said path to a distance not greater than the maximum amplitude of the crimps desired in said yarn; and heat setting the yarn removed from said treating path in crimped form.

10. A method for producing a crimped thermoplastic yarn, comprising the steps of feeding a thermoplastic yarn which is flexible in all directions into a treating path at a predetermined speed; removing said yarn from said treating path at a speed less than said predetermined speed so that yarn removed from said treating path is in crimped form; confining said yarn along said path to limit deflection of said yarn in all directions transverse to the direction of said path to a distance not greater than the maximum amplitude of the crimps desired in said yarn; and gripping the yarn removed from said treating path and holding it in crimped form by opposed substantially elongated travelling surfaces.

References Cited in the file of this patent

UNITED STATES PATENTS

| Number | Name | Date |
|---|---|---|
| 2,263,712 | Wrigley et al. | Nov. 25, 1941 |
| 2,500,690 | Lannan | Mar. 14, 1950 |
| 2,502,129 | Brabander | Mar. 28, 1950 |
| 2,514,557 | Pfau | July 11, 1950 |
| 2,575,781 | Barach | Nov. 20, 1951 |
| 2,575,833 | Pfau et al. | Nov. 20, 1951 |
| 2,575,839 | Rainard | Nov. 20, 1951 |
| 2,623,266 | Hemmi | Dec. 30, 1952 |
| 2,669,001 | Keen | Feb. 16, 1954 |
| 2,693,008 | Upton et al. | Nov. 2, 1954 |
| 2,698,970 | Wicker | Jan. 11, 1955 |
| 2,715,309 | Rosenstein et al. | Aug. 16, 1955 |
| 2,734,251 | Rainard et al. | Feb. 14, 1956 |
| 2,734,252 | Shattuck | Feb. 14, 1956 |
| 2,747,233 | Hitt | May 29, 1956 |
| 2,758,357 | Goodhue | Aug. 14, 1956 |
| 2,793,418 | Pfau | May 28, 1957 |
| 2,794,239 | Crawford et al. | June 4, 1957 |
| 2,807,862 | Griset | Oct. 1, 1957 |
| 2,820,278 | Mariani et al. | Jan. 21, 1958 |
| 2,882,673 | Buddecke | Apr. 21, 1959 |